United States Patent [19]
Dangel

[11] Patent Number: 5,375,482
[45] Date of Patent: Dec. 27, 1994

[54] GEARBOX FOR A FRONT WHEEL DRIVE AND TRANSVERSE ENGINE VEHICLE IMPROVING THE ABILITY OF THE LATTER TO COPE WITH DIFFICULT GROUND

[76] Inventor: Henry Dangel, 54 Avenue de la 1ère D.B., Mulhouse, France, 68100

[21] Appl. No.: 73,475

[22] Filed: Jun. 9, 1993

[30] Foreign Application Priority Data

Jun. 9, 1992 [FR] France ................... 92 06917

[51] Int. Cl.$^5$ ............... F16H 57/02; F16H 3/08
[52] U.S. Cl. ................... 74/606 R; 74/359; 74/360
[58] Field of Search ........... 74/606 R, 359, 357, 74/358, 360

[56] References Cited

U.S. PATENT DOCUMENTS

| | | | |
|---|---|---|---|
| 4,708,026 | 11/1987 | Ikemoto | 74/359 |
| 4,718,295 | 1/1988 | Jesena | 74/359 X |
| 4,738,150 | 4/1988 | Miner | 74/359 |
| 4,802,373 | 2/1989 | Saint-Jean et al. | 74/359 |
| 4,960,005 | 10/1990 | Kashiwase | 74/359 X |
| 5,025,674 | 6/1991 | McAskill | 74/360 |
| 5,044,215 | 9/1991 | Watanabe | 74/359 X |

FOREIGN PATENT DOCUMENTS

| | | | |
|---|---|---|---|
| 0034814 | 9/1981 | European Pat. Off. | 74/606 R |
| 58-77954 | 5/1983 | Japan | 74/359 |
| 58-94657 | 6/1983 | Japan | 74/359 |
| 3-117749 | 5/1991 | Japan | 74/359 |
| 1178244 | 1/1970 | United Kingdom | 74/606 |
| 2112088 | 7/1983 | United Kingdom | 74/606 R |
| 2159898 | 12/1985 | United Kingdom | 74/359 |

*Primary Examiner*—Vinh T. Luong
*Attorney, Agent, or Firm*—Wenderoth, Lind & Ponack

[57] ABSTRACT

A gearbox of a front wheel drive vehicle, having a transverse engine, includes a hollow main shaft carrying gears corresponding to different speeds, and has a driving input shaft extending therethrough so as to be rotatable relative to the hollow main shaft, with the driving input shaft having an end gear beyond the end portion of the hollow main shaft. An output shaft in the gearbox has output shaft gears rotatably mounted thereon, with the output shaft gears being permanently engaged with the main shaft gears. Synchronizers fix selected ones of the output shaft gears with the output shaft. A speed reducer is provided, and includes a secondary shaft that is parallel with the hollow main shaft. Two speed reducer gears are rotatably mounted on the secondary shaft and engaged with respective gears of the main shaft gears at different gear ratios corresponding to ranges of different speeds. A speed reducer synchronizer is interposed between the two speed reducer gears on the secondary shaft for fixing one of the speed reducer gears to the secondary shaft. A fixed gear on the secondary shaft is engaged with the end gear of the driving input shaft.

8 Claims, 3 Drawing Sheets

GEARBOX FOR A FRONT WHEEL DRIVE AND TRANSVERSE ENGINE VEHICLE IMPROVING THE ABILITY OF THE LATTER TO COPE WITH DIFFICULT GROUND

BACKGROUND OF THE INVENTION

The present invention relates to a gearbox for a front wheel drive vehicle with a transverse engine of the type comprising a main shaft carrying gears pertaining to different speeds of the gearbox, an output shaft on which are freely rotatable gears permanently engaged with the gears of the main shaft, and synchronizers for fixing selected ones of the rotatable gears to the output shaft.

More precisely, the invention concerns d gearbox for vehicles of the "multi-road" type which are, as is known, derived from series vehicles and equipped with devices for the motorization of the normally undriven axle. These motorization devices improve the ability of the vehicle to cope with difficult ground.

SUMMARY OF THE INVENTION

An object of the invention is to provide a gearbox which provides a second range of reduced speeds, at least on the front axle of the vehicle, and optionally on its rear axle when the drive of the rear axle is also engaged thereby making all four wheels driving wheels. This second range of reduced speeds ensures that the vehicle does not remain immobilized on difficult, for example muddy, terrain, and avoids burning out the clutch.

comprises a

According to the invention, the gearbox speed reducer having at least two gears which are freely rotatable on a secondary shaft parallel to a main shaft and engaged with associated gears of the main shaft at different gear ratios pertaining to ranges of different speeds, and a synchronizer interposed between the gears on the secondary shaft for fixing to the secondary shaft either one of the gears of the secondary shaft and thereby driving the corresponding gear of the main shaft. The main shaft is hollow, and contains a driving input shaft which is freely rotatable relative to the hollow shaft and carries at one end a gear engaged with an input gear fixed in rotation on the secondary shaft.

Motion is transmitted through the secondary shaft and its gears to the gears of the main shaft and thence, as in conventional gearboxes, to the output shaft and the front axle.

The arrangement of the speed reducer and transmission between the main shaft and the speed reducer may be such that one of the gears transmits the motion to the main shaft at a ratio close to one, whereas the second transmits the motion at a substantially lower ratio. The first gear then corresponds to the range of normal speeds, while the second corresponds to the range of reduced speeds, which may be employed for driving the vehicle out of particularly difficult ground.

The gear set constituted by the end gear of the driving shaft and the input gear of the secondary shaft drives the latter and its gears, whose transmission ratios with the corresponding gears of the main shaft are adapted to the transmission ratio of the gear set so as to obtain the desired ratios.

The gearbox according to the invention requires only a few specific component parts and the modification of certain known parts, and may therefore be produced at low cost from a conventional gearbox. Further, the speed reducer may be added in a region where utilizable space is available laterally with respect to the engine unit without a large increase in the overall size.

BRIEF DESCRIPTION OF THE DRAWINGS

The invention will now be described with reference to the accompanying drawings which illustrate an embodiment of the invention by way of a non-limitative example.

In the drawings.

DETAILED DESCRIPTION OF THE PREFERRED EMBODIMENT

Figure 1:
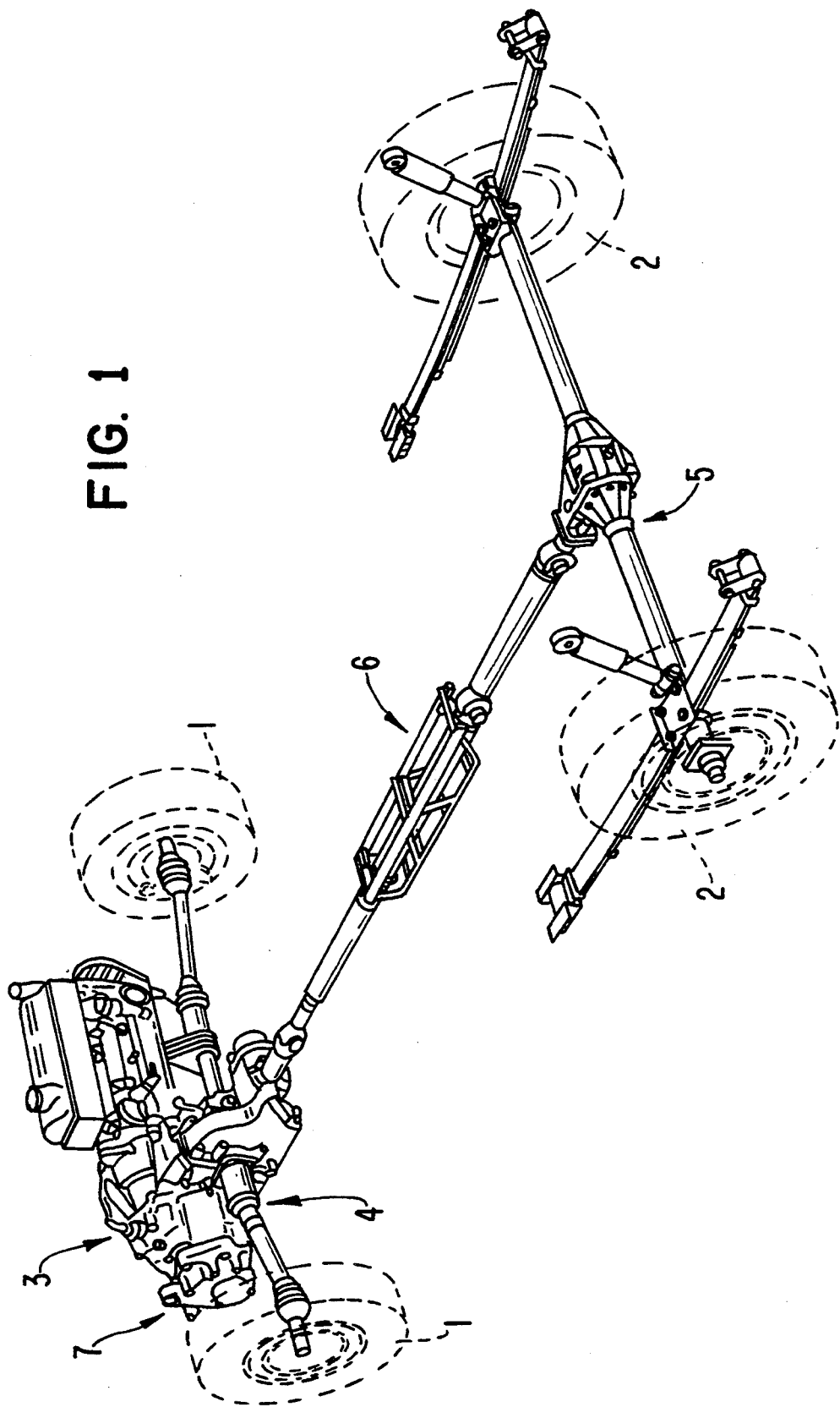
FIG. 1 is a perspective view of a transmission and a transverse engine unit of a front wheel drive vehicle to which the invention may be applied.
Figure 2:
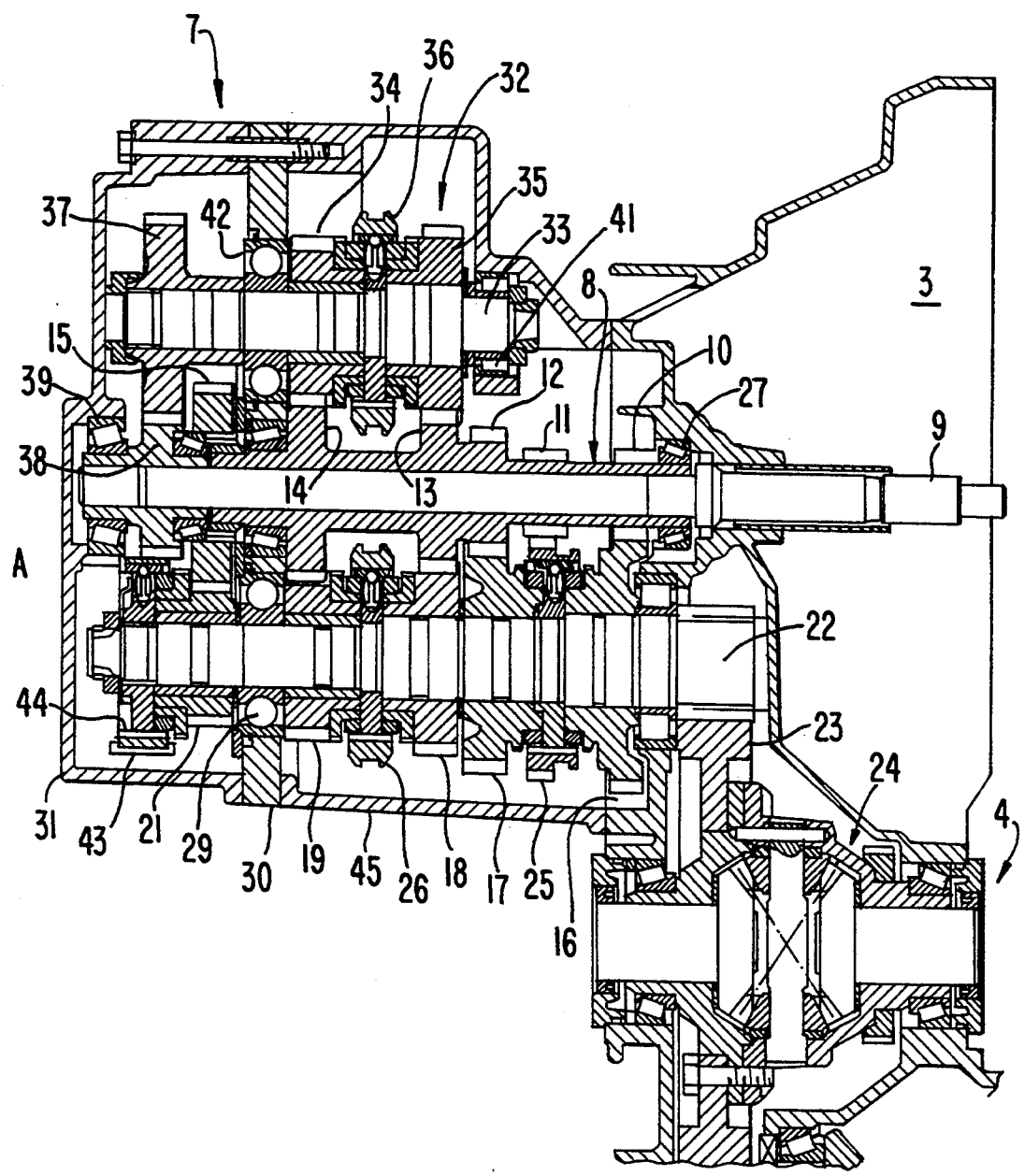
FIG. 2 is a half-elevational and half-sectional view, taken on line 2—2 of FIG. 3, of an embodiment of the gearbox according the invention.
Figure 3:
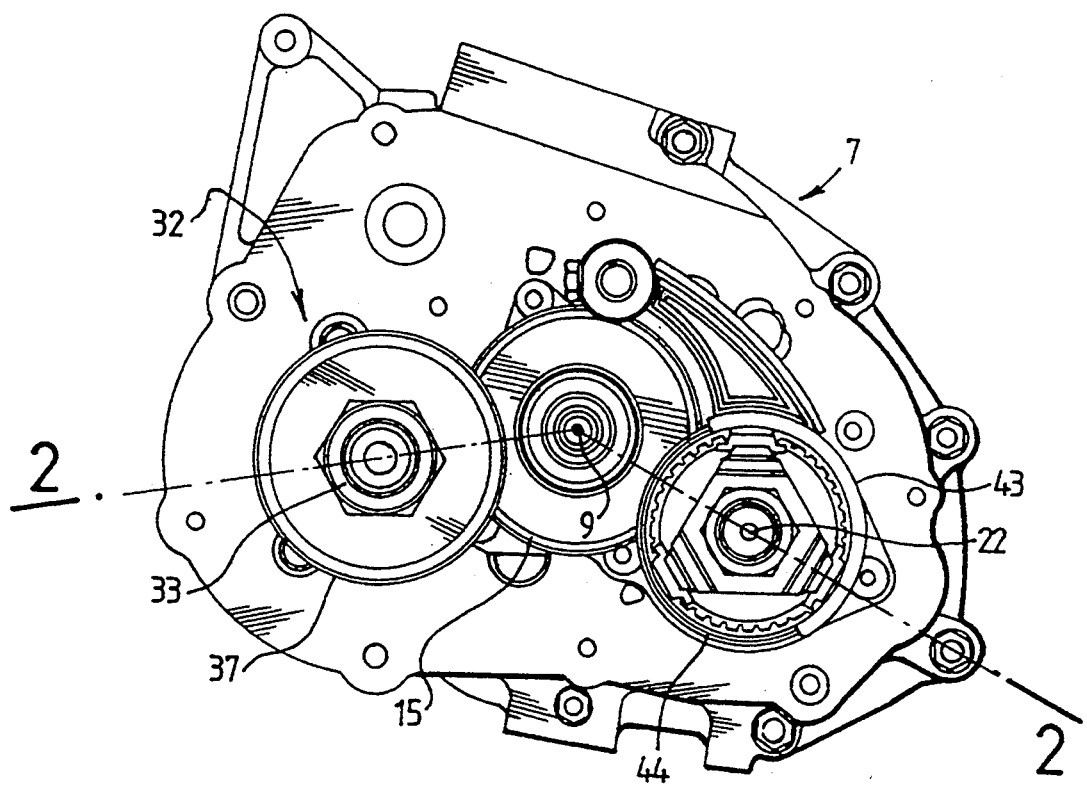
FIG. 3 is a side elevational view, in the direction of arrow A of FIG. 2, with a case and one gear of the gearbox removed of the gearbox according to the invention

Shown in FIG. 1 is the transmission system of a vehicle having four wheels 1, 2, a transverse engine unit 3, a front axle 4, a rear axle 5 and a longitudinal shaft 6. The transmission of this front wheel drive vehicle whose rear axle 5 may be motorized, may be advantageously provided with a gearbox 7 according to the invention, an embodiment of which will now be described with reference to FIGS. 2 and 3.

The gearbox 7 comprises a hollow main shaft 8 which contains an input shaft 9 connected to the engine unit 3 by which it is driven in rotation, this input shaft being freely rotatable with respect to the hollow shaft 8. The latter comprises a series of gears 10 ... 15 permanently engaged with corresponding gears 16, 17, 18, 19, 21, which are freely rotatable on an output shaft 22 parallel to the shafts 8 and 9. The output shaft 22 is drivingly engaged with a gear wheel 23 which cooperates in a known manner with a differential 24 mounted adjacent one end of the front axle 4. Beyond the differential 24, a drive take-off (not shown) known per se is mounted for motorizing the rear axle and thereby making all four wheels driving wheels.

The freely rotatable gears 16, 17, 18, 19, 21 respectively correspond to the first, second, third, fourth and fifth speeds of the gearbox. Synchronizers 25, 26 and 44 are mounted in a known manner between the gears 16 and 17 of the first and second speeds and the gears 18 and 19 of the third and fourth speeds, the synchronizer 44 being placed against the fifth speed gear 21. In a known manner, these synchronizers include forks and are cooperative with the selected one of the associated gears so as to fix it to the shaft 22, which permits using the whole of the transmission at the selected speed.

The main shaft 8 is provided with a plurality of roller bearings, such as 27 and 39, and the output shaft 22 extends through a ball bearing 29 which Dears against a spacer plate 30 partitioning the case 31 off from a clutch case 45. Likewise, the bearings 27 and 39 bear against the respective cases 45 and 31.

The gearbox 7 includes a speed reducer 32 which has a secondary shaft 33 parallel to the shaft 9 is and, located with respect to the latter, on the opposite side to the output shaft 22. Two gears 34 and 35 are freely rotatable on the shaft 33 and are engaged with the gears 14 and 13 of the main shaft 8 respectively. A synchronizer 36 is placed between the gears 34 and 35 permits in a known manner, fixing a selected one of these gears to the shaft 33 which is also provided with an input gear 37. The latter is connected to rotate with the shaft 33 and is engaged with an end gear 38 mechanically fixed on the input shaft 9. The gear 38 has a hub engaged in the roller bearing 39. The shaft 33 is mounted in a roller bearing 41 and a ball bearing 42 in the illustrated embodiment, and these bearings are supported by the case 31.

The presence of the gear 38 of the gear set interconnecting the input shaft 9 and the shaft 33 of the speed reducer 32 reduces the volume available for the fork of the synchronizer 44 of the gear 21 of the fifth speed. This synchronizer 44 is therefore provided with a fork 43 which is modified with respect to a conventional fork (not shown) associated with a synchronizer such as the synchronizer 25 or 26. Indeed, the fork 43 has a U-shaped section so as to surround the corresponding synchronizer 44 and permit actuating the latter within the small available volume.

The gearbox just described operates in the following manner.

The input shaft 9, driven in rotation by the engine unit 3 itself drives in rotation its gear 38, which drives the input gear 37 of the speed reducer 32. The gear 37 in turn drives in rotation the shaft 33, and actuation of the synchronizer 36 permits fixing as desired either the gear 34 or the gear 35, to the shaft 33. The gear 34 or 35 in turn, drives the main shaft 8 at a speed of rotation which depends on the selected speed (gear 14 of the fourth speed driven by the gear 34, or the gear 13 of the third speed driven by the gear 35). The transmission ratios from the gears 34 and 35 to the respective gears 14 and 13 are different: the ratio of the gears 35 and 13 may be so chosen as to be the inverse or substantially the inverse of the ratio of the gears 38 and 37, so that the sum of these two ratios is around 1. In this case, the shaft 8, driven by the gear 35, rotates at substantially the same speed as the speed it would have in the absence of the speed reducer 32. On the other hand, the ratio of the gears 34 and 14 is so chosen that, bearing in mind the ratio of the gears 38 and 37, the shaft 8, driven by the gears 34 and 14, rotates at a lower speed than the speed at which it is driven by the gears 35 and 13.

Thus, when the synchronizer 36 fixes the gear 35 to the shaft 33, the gearbox 7 can operate with a range of normal speeds. On the other hand, if the vehicle is engaged on difficult ground, for example on a steep slope, on a surface of loose stones, or on muddy ground, so that it cannot be extracted from the ground with a range of normal speeds, or there is a risk of destroying the clutch, the driver engages in a known manner (not shown) the synchronizer 36 with the gear 34. The main shaft 8 is then driven in rotation through the gears 34 and 14 at a reduced speed. The same is consequently true of the rotation of the output shaft 22 at the speed selected by the driver, and therefore of the wheels 1 of the front axle 4. Of course, the driver may use the rear drive take-off so as to turn the rear wheels 2 into driving wheels, which will also rotate at reduced speed.

The following table provides a non-limitative numerical example of the ratios available with the gearbox 7 according to the invention. The left parts correspond to a conventional gearbox without a speed reducer, while the right parts correspond to a gearbox equipped with the speed reducer 32 of the invention. In this example, the ratio of the gearing 38/37 is equal to the ratio of the gearing 24/37, the ratio of the long range (gears 35-13) is 35/28 and the ratio of the short range (gears 34-14) is 30/34.

The invention provides the aforementioned technical advantages without notably increasing the overall size of the gearbox. Indeed, the part of the cases 31 and 45 required for housing the speed reducer 32 is of small volume and may be placed in the space available under the bonnet or hood. It should, moreover, be noted that the construction of the gearbox according to the invention requires making only a small number of specific or modified component parts (shafts 8 and 9, gears 38 and 37, cases 31 and 45, fork 43), the other parts of the gearbox being commercially available. Consequently, this gearbox is cheap to manufacture.

|  | Series gearbox axle 13/73 | | Gearbox with speed reducer axle 12/62 | | |
|---|---|---|---|---|---|
|  | | | | long range | short range |
|  | ratio | km/h | ratio | km/h | km/h |
| 1st | 11/41 | 6.15 | 12/41 | 5.91 | 4.17 |
| 2nd | 18/35 | 11.79 | 18/35 | 10.39 | 7.33 |
| 3rd | 27/37 | 16.72 | 28/35 | 16.16 | 11.41 |
| 4th | 32/31 | 23.66 | 34/30 | 22.89 | 16.16 |
| 5th | 43/33 | 29.86 | 46/31 | 29.97 | 21.16 |

The speed reducer 32 may have more than two gears 34 and 35, for example three, which would provide three ranges of speeds instead of two. Further, in an alternative arrangement, the synchronizer 44 and its U-sectioned fork 43 may be replaced by a synchronizer and a conventional fork, which would, however, be of smaller sizes, bearing in mind the limited available volume.

What is claimed is:

1. A gearbox, comprising:
   a hollow main shaft carrying main shaft gears corresponding to different speeds and having an end portion;
   a driving input shaft extending through said hollow main shaft and being rotatable in said hollow main shaft, said driving input shaft having an end gear on an end thereof beyond said end portion of said hollow main shaft;
   an output shaft having output shaft gears mounted so as to be rotatable thereon, said output shaft gears being permanently engaged with said main shaft gears, and synchronizers for fixing selected ones of said output shaft gears with said output shaft; and
   a speed reducer comprising a secondary shaft parallel with said hollow main shaft, two speed reducer gears mounted so as to be rotatable on said secondary shaft engaged with respective gears of said main shaft gears at different gear ratios corresponding to respective complete ranges of gear ratios, a speed reducer synchronizer interposed between said two speed reducer gears on said secondary shaft for fixing one of said two speed reducer gears to said secondary shaft, and a fixed gear fixed in rotation with said secondary shaft and engaged with said end gear on said driving input shaft.

2. The gearbox of claim 1, wherein said output shaft gears comprise a last speed gear, and said synchronizers comprise a last speed gear synchronizer having a fork with a U-shaped section capping said last speed gear synchronizer, said last speed gear synchronizer being cooperative with said last speed gear and positioned adjacent to said end gear of said driving input shaft.

3. The gearbox of claim 1, wherein said main shaft gears comprise at least four gears, and said output shaft gears comprise at least four gears engaged with respective said main shaft gears corresponding to four different speeds.

4. The gearbox of claim 3, wherein said main shaft gears further comprise a fifth gear and said output shaft gears further comprise a fifth gear engaged with said fifth gear of said main shaft gears corresponding to a fifth speed.

5. The combination of a front wheel drive vehicle having a transverse engine and a gearbox connected with said transverse engine, said gearbox comprising:

- a hollow main shaft carrying main shaft gears corresponding to different speeds and having an end portion;
  - a driving input shaft extending through said hollow main shaft and being rotatable in said hollow main shaft, said driving input shaft having an end gear on an end thereof beyond said end portion of said hollow main shaft;
- an output shaft having output shaft gears mounted so as to be rotatable thereon, said output shaft gears being permanently engaged with said main shaft gears, and synchronizers for fixing selected ones of said output shaft gears with said output shaft; and
- a speed reducer comprising a secondary shaft parallel with said hollow main shaft, two speed reducer gears mounted so as to be rotatable on said secondary shaft engaged with respective gears of said main shaft gears at different gear ratios corresponding to respective complete ranges of gear ratios, a speed reducer synchronizer interposed between said two speed reducer gears on said secondary shaft for fixing one of said two speed reducer gears to said secondary shaft, and a fixed gear fixed in rotation with said secondary shaft and engaged with said end gear on said driving input shaft.

6. The combination of claim 5, wherein said output shaft gears comprise a last speed gear, and said synchronizers comprise a last speed gear synchronizer having a fork with a U-shaped section capping said last speed gear synchronizer, said last speed gear synchronizer being cooperative with said last speed gear and positioned adjacent to said end gear of said driving input shaft.

7. The combination of claim 5, wherein said main shaft gears comprise at least four gears, and said output shaft gears comprise at least four gears engaged with respective said main shaft gears corresponding to four different speeds.

8. The combination of claim 7, wherein said main shaft gears further comprise a fifth gear and said output shaft gears further comprise a fifth gear engaged with said fifth gear of said main shaft gears corresponding to a fifth speed.

* * * * *